Figure 5:
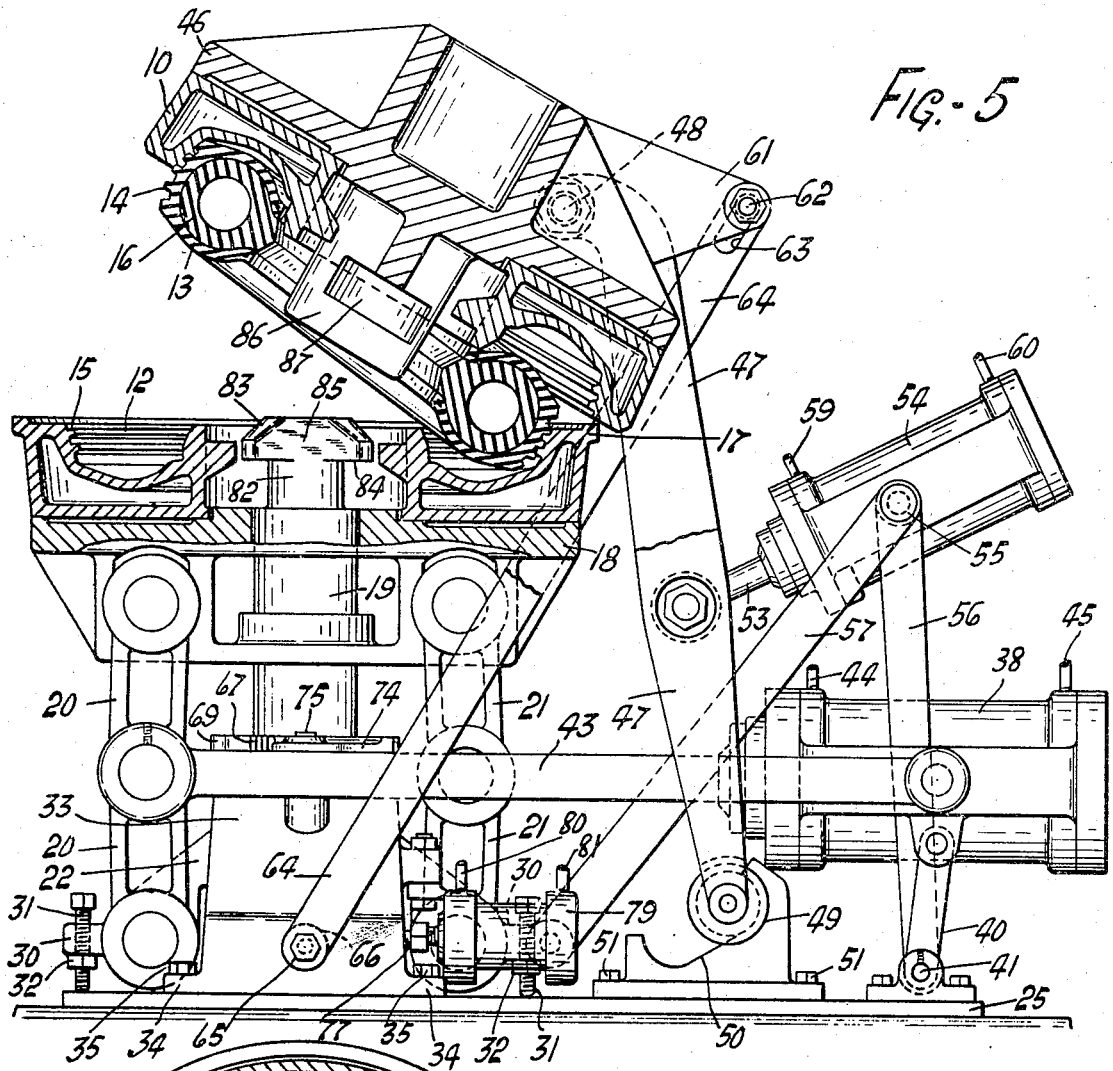

Jan. 25, 1944.  O. J. KUHLKE  2,340,191
TIRE VULCANIZING PRESS AND METHOD OF STRIPPING TIRES FROM MOLDS
Filed Sept. 21, 1938   5 Sheets-Sheet 1
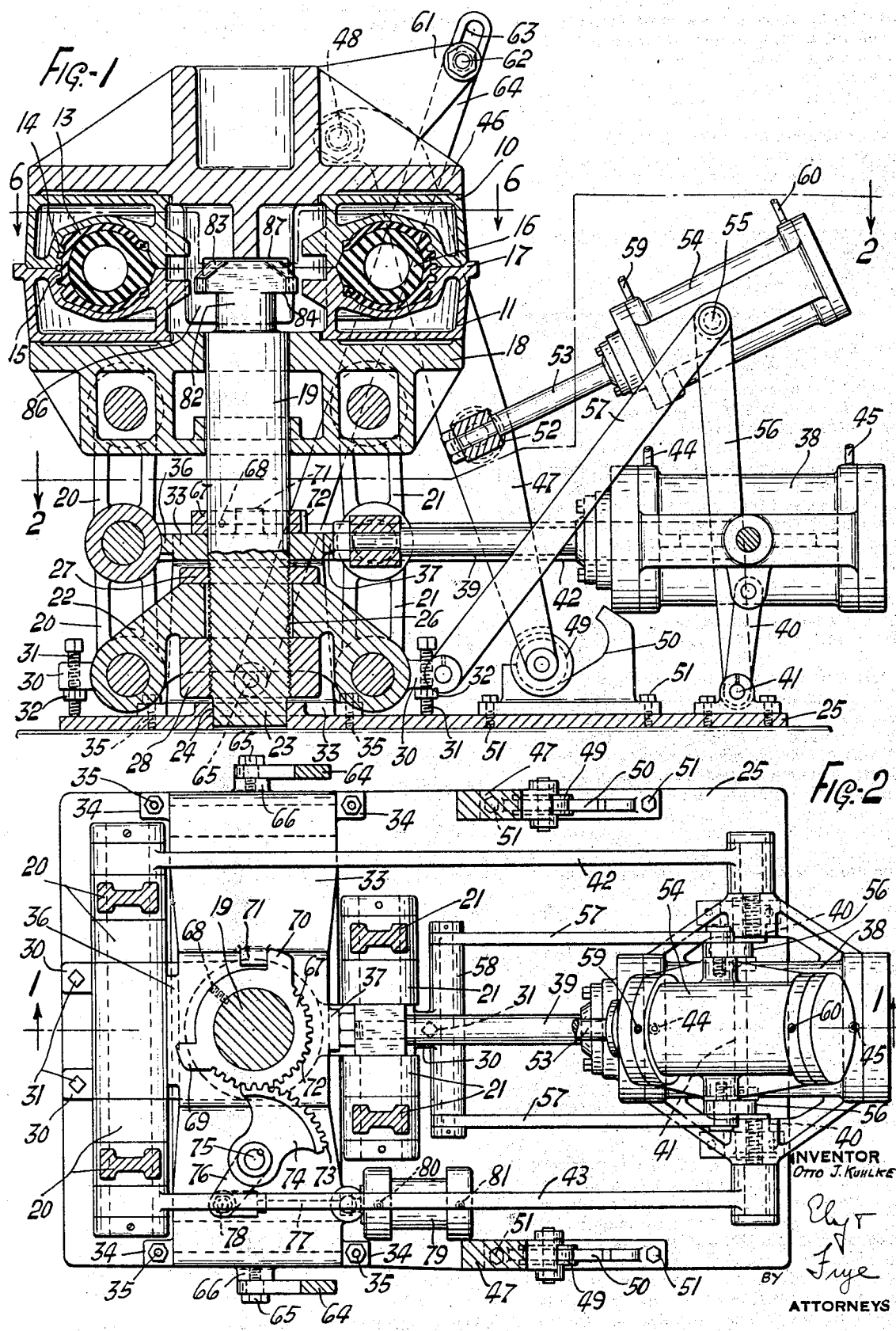
INVENTOR
Otto J. Kuhlke
BY
ATTORNEYS Jan. 25, 1944. O. J. KUHLKE 2,340,191
TIRE VULCANIZING PRESS AND METHOD OF STRIPPING TIRES FROM MOLDS
Filed Sept. 21, 1938 5 Sheets-Sheet 3

INVENTOR
OTTO J. KUHLKE

BY Elyr Frye

ATTORNEYS

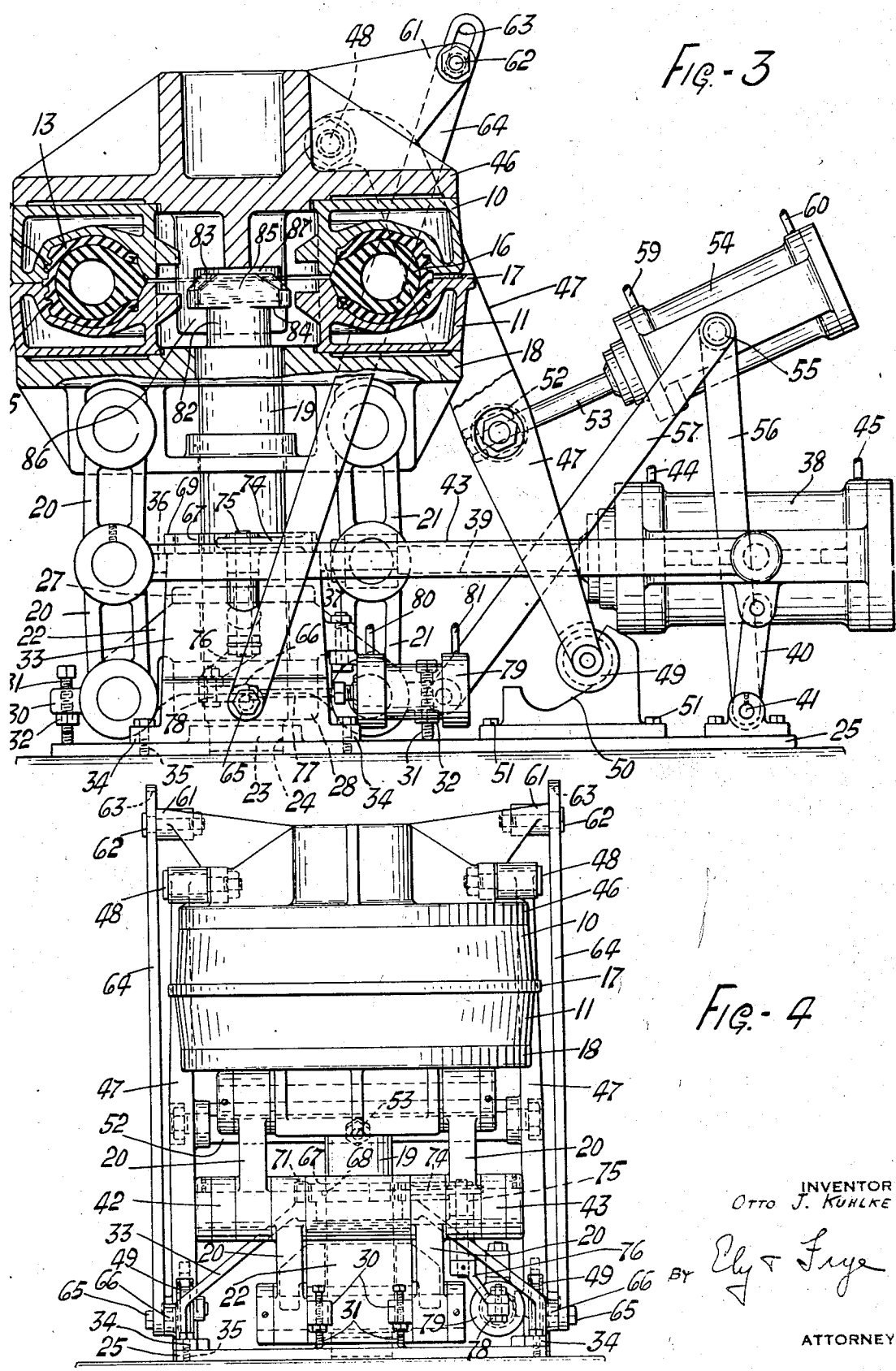

Jan. 25, 1944.   O. J. KUHLKE   2,340,191
TIRE VULCANIZING PRESS AND METHOD OF STRIPPING TIRES FROM MOLDS
Filed Sept. 21, 1938   5 Sheets-Sheet 4

INVENTOR
OTTO J. KUHLKE

BY
Ely r Frye

ATTORNEYS

Jan. 25, 1944. O. J. KUHLKE 2,340,191
TIRE VULCANIZING PRESS AND METHOD OF STRIPPING TIRES FROM MOLDS
Filed Sept. 21, 1938 5 Sheets-Sheet 5

INVENTOR
OTTO J. KUHLKE
BY
Ely & Frye
ATTORNEYS

Patented Jan. 25, 1944

2,340,191

UNITED STATES PATENT OFFICE 2,340,191

TIRE VULCANIZING PRESS AND METHOD OF STRIPPING TIRES FROM MOLDS

Otto J. Kuhlke, Akron, Ohio, assignor to The McNeil Machine and Engineering Company, Akron, Ohio, a corporation of Ohio Application September 21, 1938, Serial No. 230,970

17 Claims. (Cl. 18—17)

This invention relates to improvements in vulcanizing presses which are adapted for use in the vulcanization of pneumatic tires and the like. More particularly it relates to presses of the individual or watch-case type wherein a tire is vulcanized between upper and lower mold sections which are heated usually by steam jackets.

Presses of this type are well known in the art and it is an object of the present invention to provide a press which is a substantial improvement upon previous press designs and which will secure new and beneficial results.

Another object is to proivde a press of the character referred to wherein at least one of the mold sections is operated in a selected path whereby it functions to strip the tire from the mold. This operation comprises shifting one mold section laterally with respect to the other section at the start of the mold opening movement. This causes the tire, which is held at this time by the non-skid tread formation, to strip at one side from one mold element and at the other side from the other mold element. By this action the tire is peeled or stripped from the mold without making it necessary to provide any separate tire ejecting means. The tire will be lifted by its forward, upper tread surface so that it moves into a diagonal plane as the press continues to open, and as the press approaches its fully opened position, the tire will drop out of the upper half. The press operation also makes it possible to utilize mechanical means to convey the tire away as it is practical to employ a hook or mechanically operated arm which will enter the opening between the mold sections below the tire just as the latter is ready to free itself from the non-skid formation in the upper mold section.

A further object is to provide novel operating mechanism which conveys the laterally movable mold section through its peculiar path.

A further object is to provide a positive locking means for locking the upper mold element in closed position to a central post whereby such element cannot be opened until unlocked.

A further object is to provide a novel method for stripping or releasing vulcanized tires from molds.

Other objects and advantages will become apparent from the following description taken in conjunction with the accompanying drawings.

It is to be understood that while the invention is adapted to and shown with a single tire cavity, the principles thereof may readily be incorporated in presses which have a plurality of molding cavities, such, for example, as dual or twin tire presses. Also, it will be undrestood that the features of the invention which relate to means for operating the laterally movable mold section may be applied to presses for vulcanizing other articles than automobile tires, such, for example, as tubes, bicycle and motorcycle tires, and other articles of vulcanized rubber.

Figure 6:
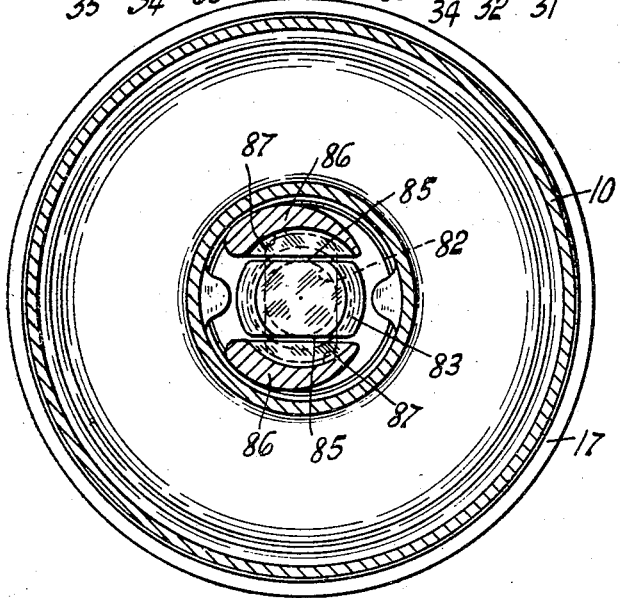
Figure 7:
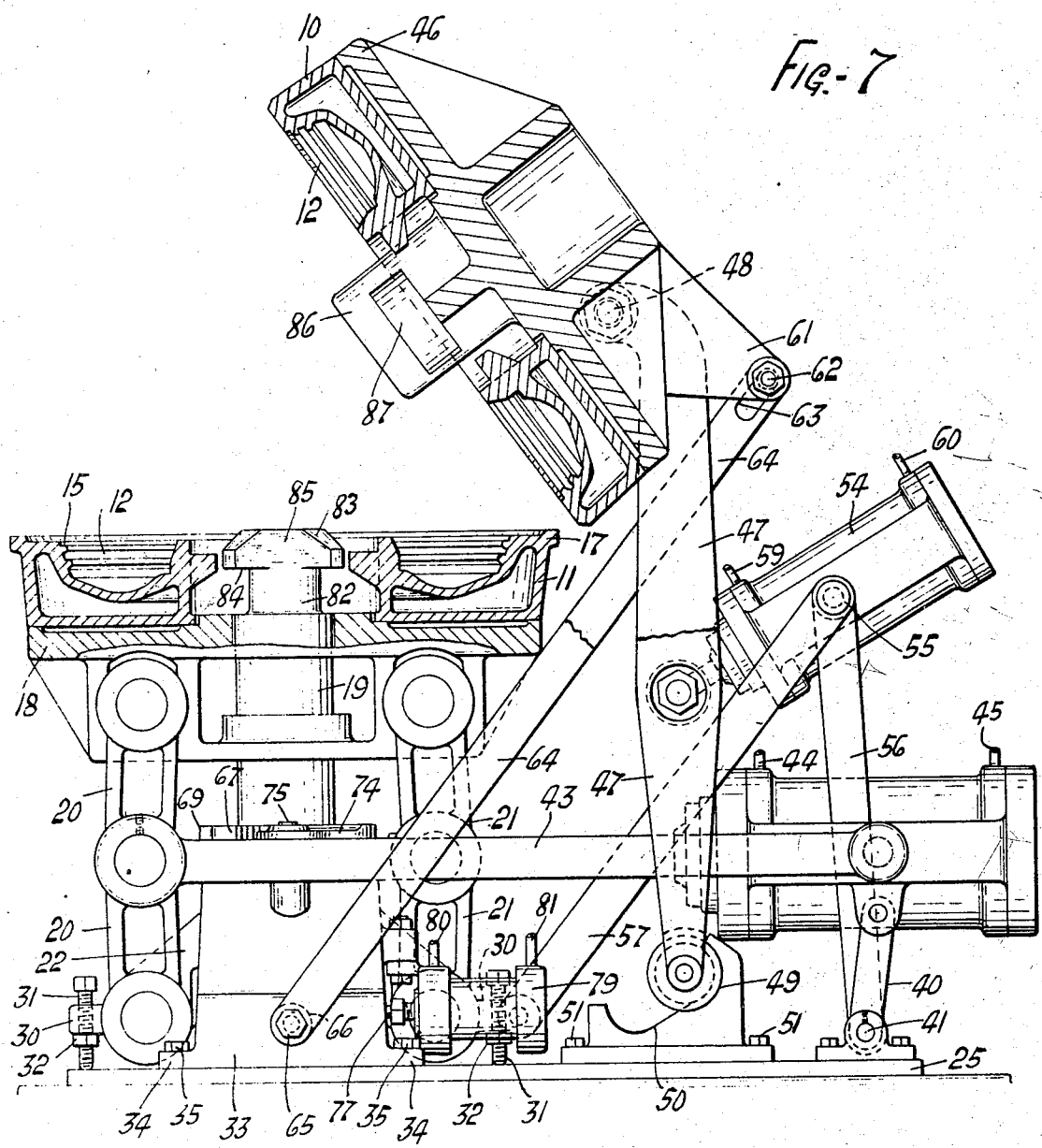
Figure 8:
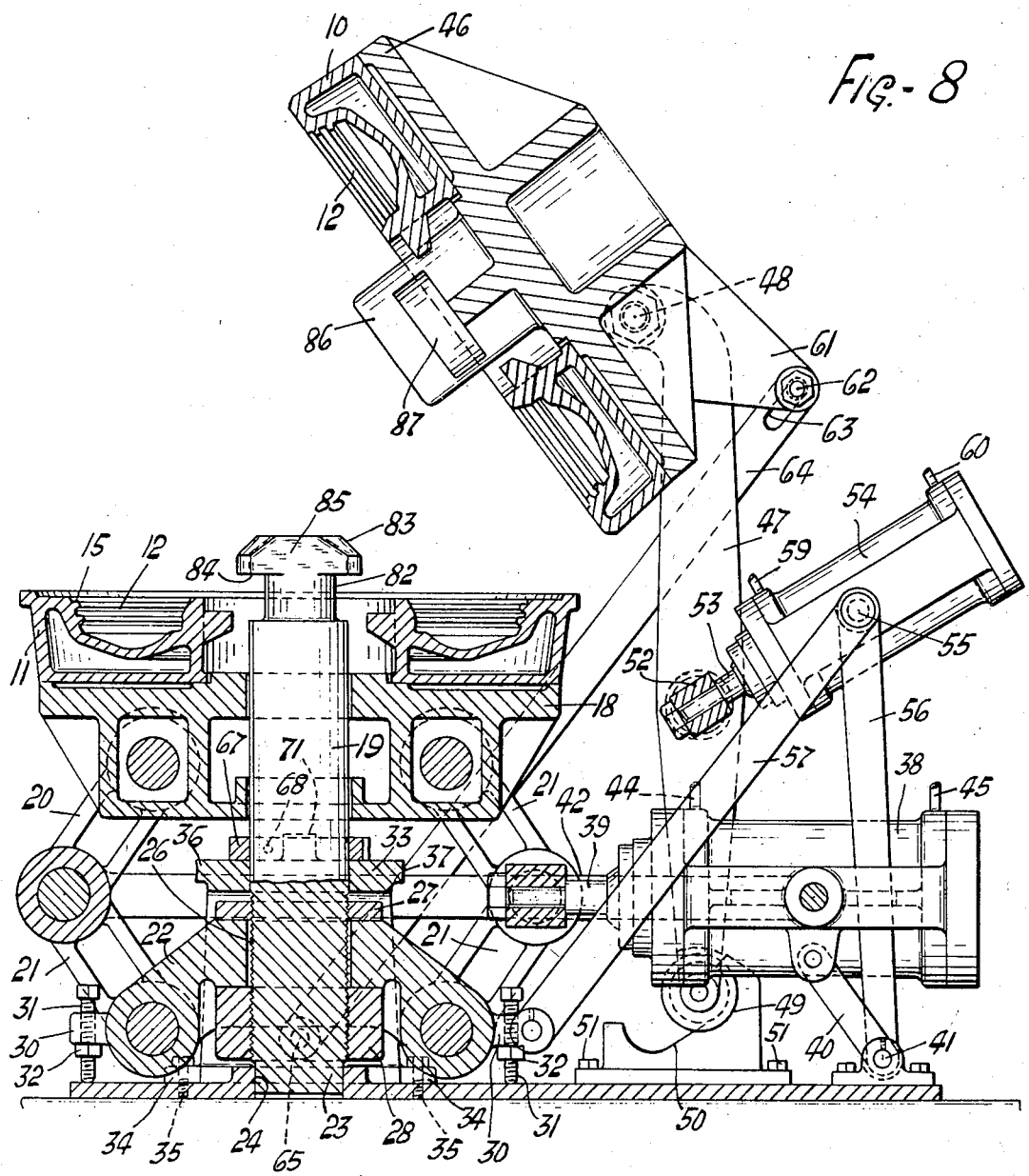

In the drawings:

Fig. 1 is a vertical section with some parts in elevation, taken substantially on line 1—1 of Fig. 2 showing a press having an automobile tire casing therein with the mold sections in closed position, Fig. 2 is a horizontal section taken substantially on line 2—2 of Fig. 1, with some parts shown in elevation, Fig. 3 is a view similar to Fig. 1 with the upper mold element slightly tilted forward, Fig. 4 is an elevation to reduced scale, viewed from the left-hand side of Fig. 1, omitting the operating cylinders, Fig. 5 is a view similar to Fig. 1 with the mold sections partially opened, Fig. 6 is a fragmentary sectional view taken substantially on line 6—6 of Fig. 1 and showing part of the upper mold section and the locking means for same, Fig. 7 is a view similar to Fig. 1 showing the upper mold section at the limit of its outward movement with the tire removed from the mold, and Fig. 8 is a view similar to Fig. 7 with the lower mold section moved downwardly.

Referring to the drawings the numeral 10 designates the upper mold element while the lower mold element is indicated at 11. Both mold elements preferably are steam jacketed, as shown in the drawings, being connected to a suitable source of steam (not shown). Each mold element contains a section of the tire molding cavity 12 in which is shown, in Figs. 1, 3 and 5, a molded tire 13 characterized by the non-skid tread formation 14 which is formed therein by the corresponding non-skid formation 15 in the tread area of the tire mold elements 10 and 11. When the tire is vulcanized, the rubber fills the recesses in the tread design and there is a tendency for the tread of the tire to cling in the formations in the mold and this property is utilized in the present invention to facilitate the removal of the tire from the mold. So far as applicant is aware, he is the first person to invent a method and means for compressing a tire between opposite diagonal areas on the tread to strip the tire from the mold.

The tire 13 is shown upon the usual air bag 16 which fits at its inner edge between the beads of the tire. This bag is connected to the usual inflating pressure line common to this art (not shown). It will be noted that no bead rings or stripping rings are shown in the drawings, it being unnecessary to employ such devices in this improved press.

Before further describing the elements of the press, I will discuss my method of stripping a tire from the mold. As shown in Fig. 1, which shows the mold in closed or operative position, upper mold element 10 seats within a relatively low cylindrical flange 17 formed on lower element 11. Before the upper mold element can partake of relative lateral movement with respect to the lower mold element, the former must have a portion lifted or tilted upwardly to clear flange 17. I prefer to tilt or lift the rear portion of the mold, as indicated in Fig. 3, and I have illustrated mechanism for this purpose, but it will be obvious that any desired tilting of the mold elements may be resorted to so as to permit relative lateral movement between the mold elements. In no case, however, should this lifting movement be continued for any appreciable distance before oblique movement of the upper mold element begins, for otherwise the tire might free itself from the upper half of the mold which would prevent achievement of the peculiar stripping action which is characteristic of this press. The stripping operation which is performed here is due to the fact that the tread formation on the tire is interlocked with the recesses in the mold when the oblique movement is started.

After the rear portion of the upper mold element has been lifted as in Fig. 3, the latter element is moved laterally relative to the lower mold element and pivotally moved to open the press. Fig. 5 illustrates the point in the pivotal movement of the upper mold element just prior to the dropping of the upper portion of the stripped tire onto the lower mold element. Fig. 7 shows the completed pivotal movement of the upper mold element and Fig. 8 shows the lower mold element lowered somewhat to permit more easily the removal of the tire. The lowering of the lower mold element may not be required with all sizes and types of tires, but this feature is available in my press if its use is desired.

Means are provided to operate the mold elements to accomplish the stripping of a tire in the manner described, and to control the raising and lowering of the lower mold element. As shown, the lower mold element 11 is fixed on a lower platen 18 which is mounted for vertical movement about a rotatable, central, vertical post 19 by means of spaced pairs of toggle arms 20 and 21. The upper ends of the toggle arms are suitably secured to platen 18, while the lower ends are similarly secured to a casting 22 arranged near the bottom of post 19. The latter has a reduced lower end 23 provided with a bearing surface which is received in a bearing opening 24 formed in a base plate 25. Above the lower end 23, post 19 is threaded for a portion of its length at 26 to receive upper and lower spaced nuts 27 and 28 between which nuts, casting 22 is held in proper position with respect to the post, as shown in Fig. 1. Lateral extensions 30 are formed on casting 22 (two on the front and one on the rear) to receive vertical adjusting bolts 31 having lock nuts 32 thereon, said bolts contacting the upper surface of base plate 25. To adjust the height of the lower mold element so as to insure a proper fit with the upper mold element when the press is closed, it is only necessary to release nuts 27 and 28 sufficiently to permit vertical movement of casting 22 without moving the post, then turn bolts 31 until the lower mold element, through the medium of the toggle arms, reaches the desired height. Nuts 27 and 28 are then moved to proper position to hold casting 22, but the engagement of these nuts with the casting should not be tight enough to prevent limited rotation of post 19 as will be later referred to.

An additional bearing for post 19 is provided by the upper portion of a bracket 33, through which the post extends, which bracket has depending supporting portions 34 secured to base plate 25 by bolts 35. Lateral extensions 36 and 37 are formed on the upper portion of bracket 33 to serve as limit stops for the toggle arms so the latter cannot move inwardly beyond the position shown in Fig. 1, thus preventing the toggle arms from reaching a dead center or over center position which might prevent efficient operation of the lower mold element.

Referring to Fig. 2 it will be noted that toggle arms 20 are spaced farther apart than arms 21. This is to facilitate the operation of both pairs of arms from a single unit, which in this instance comprises a double acting cylinder 38 having a piston rod 39 operatively connected thereto, said cylinder being pivotally mounted on a pair of parallel arms 40 pivotally mounted to base plate 25, as at 41. A pair of spaced parallel arms 42 and 43 (Fig. 2) are operatively connected between toggle arms 20 and cylinder 38, and piston rod 39 is operatively connected to toggle arms 21, the arrangement being such that when air or other fluid is admitted to one end of cylinder 38 through port 44, the piston rod 39 and cylinder 38 will be moved from the position in Fig. 1 to that in Fig. 8, collapsing the toggle arms and lowering the lower mold element as shown in the latter figure. When air is admitted through port 45 into cylinder 38, the latter and piston rod 39 will return to the position in Fig. 1, thereby raising the lower mold element. As previously explained, the use of the movable feature of the lower mold element is optional, although I prefer to use this feature particularly in closing the press as will be later pointed out. If the size of the tire vulcanized requires lowering of the lower mold element to facilitate placement or removal of the tire, such element can be readily lowered. If the lowering mechanism is not used, the lower mold element will function in the same manner as a stationary member and will not affect the operation of the other parts of the press.

The upper mold element 10 is suitably secured to an upper platen 46 whereby the mold elements will fit together in closed position as shown in Fig. 1. To control pivotal movement of the upper mold element during opening and closing of the mold, a pair of spaced arms 47 are pivotally connected at their upper ends to platen 46 as at 48, while their lower ends are each pivotally connected to a roller 49 mounted for limited movement on an inclined track 50, said tracks being arranged on opposite sides of base plate 25 and being secured to the latter by bolts 51. Intermediate their ends arms 47 are suitably connected by a cross bar 52 to which is pivotally secured one end of a piston rod 53 operatively connected to a double acting cylinder 54 in the customary manner. Cylinder 54 is pivotally mounted as at 55 on a pair of spaced arms 56 and a second pair of spaced arms 57. Arms 56 are pivotally connected at their lower ends to the base plate 25, while arms 57 are similarly connected at their lower ends to a transverse projection 58 (Fig. 2) carried by one of the extensions 30 of casting 22. Ports 59 and 60 permit the entrance of air or other fluid into opposite ends of cylinder 54 to operate the piston in the cylinder and rod 53.

Upper platen 46 is provided with a pair of spaced ears 61 each of which carry a bolt or pin 62 (Fig. 4) movable in an elongated slot 63 formed in the upper ends of a pair of spaced arms 64. The latter arms are pivotally mounted at their lower ends as at 65 to extensions 66 formed on opposite sides of bracket 33. Arms 64 and slots 63 control the lateral movement of the upper mold element as will be more fully explained.

Referring particularly to Figs. 1 and 2 it will be noted that post 19 has a gear 67 secured thereto by a screw 68, the gear being located just above the upper surface of bracket 33. Gear 67 is provided with lugs 69 and 70 which engage a stop member 71 formed on bracket 33 whereby the turning movement of the gear and post 19 is limited to the section of the gear between lugs 69 and 70. Only a portion of gear 67 is provided with teeth 72 which mesh with similar teeth 73 formed on a gear segment 74 fixedly mounted to a rotatable pin 75 carried by the depending portions of bracket 33. An arm 76 is also fixed to pin 75 and extends outwardly from segment 74 whereby pin 75 and the segment may be rotated by moving the outer end of arm 76. The outer end of a piston rod 77 is pivotally connected as at 78 to arm 76, and the inner end of the piston rod is operatively connected to a double acting cylinder 79 pivotally mounted to an extension formed on bracket 33. Ports 80 and 81 permit the entrance of air or other fluid into opposite ends of cylinder 79 to control the limited turning movement of post 19.

At its upper end, post 19 has a reduced neck 82 and an enlarged tapered head 83 forming a shoulder 84 where it joins the neck. Opposite sides of the neck 82 and head 83 are flattened as at 85 (see Fig. 6), whereby when said head is in the position shown in full lines in Fig. 6, spaced arcuate projections 86 depending from the upper platen will pass by the flattened sides 85 to allow the two mold elements to come together. The head 83 and the upper platen will then appear as in Fig. 1, and after post 19 is rotated by admitting fluid to one end of cylinder 79, the post is turned to the broken line position of Fig. 6, projections 86 being cut out as at 87 to permit rotation of the post. Thus, the portions of head 83 that extend beyond the neck will be in engagement with the projections 86, as shown in Fig. 6, and the upper platen and mold element will be locked to the post 19 so that the upper mold element cannot be raised until the upper platen is unlocked from the post. To unlock the press, of course, it is only necessary to admit air or other fluid to the opposite end of cylinder 79.

After a tire has been vulcanized in the press and it is desired to open the latter and strip the tire therefrom, the press is first unlocked as previously explained. Air or other fluid is now admitted through port 59 of cylinder 54 to move piston rod 53 and arms 47. The first movement of the latter arms is from the position shown in Fig. 1 to that shown in Fig. 3 wherein the lower ends of arms 47, which are mounted on rollers 49, have been moved up the inclined tracks 54, causing the rear portion of the upper mold element to tilt forwardly or to raise upwardly sufficiently to clear flange 17 during subsequent movement. It will be observed by reference to Fig. 3 that as the upper mold element is tilted, slots 63 in arms 64 permit movement of pins 62.

Continued movement of piston rod 53 and arms 47 causes the upper mold element to move laterally relative to the lower mold element and to pivot about the lower ends of arms 47. Arms 64 and slots 63 constitute a positive guiding means which causes the upper mold element to move laterally or to shift obliquely relative to the lower mold element at the beginning of the mold opening movement. Relative lateral movement of the upper mold element with respect to the lower mold element continues until pins 62 have reached the upper ends of slots 63, thus peeling or stripping the tire, as shown in Fig. 5, at the left side from the lower mold element and at the right side from the upper mold element. The tire is lifted by its forward, upper tread surface whereby it moves into a diagonal plane, as clearly shown in Fig. 5. As the upper mold element continues to move, the tire will drop out of the upper element and can be conveyed away from the press by any suitable means as soon as the fluid pressure connection with the air bag 16 is disengaged. The limit of outward movement of the upper mold element is shown in Fig. 7. If it is desired to increase the size of the space between the mold elements, the lower mold element can be lowered in the manner previously explained.

In closing the press, an unvulcanized tire is placed in the lower mold element with the latter in its lower position, the air bag, of course, being connected to the usual source of fluid pressure. The upper platen is now moved to its closed position by admitting fluid through port 60 into cylinder 54. As soon as the upper platen passes over the head of post 19 as previously explained, the latter is rotated to lock the post and upper platen together. Finally, the lower platen and mold element is raised by operating cylinder 38 and the two mold elements come together with a green tire therein ready to be vulcanized. By first locking the upper platen in position above the lower platen I provide for positive alignment of the mold elements as they come together without danger of pinching the tire.

While I have shown the various cylinders as requiring individual operation it will be obvious that automatic control of these cylinders may be effected through the use of conventional motors and timing mechanisms which are well known in this art. Also, automatic means may be provided to control the pressure to the air bag as is well known, so that the pressure therein will be admitted to or released from the air bag at the proper time, and this means may also include a conventional timing device for operating the press opening mechanism after a fixed period of vulcanization has elapsed.

It is believed to be apparent that I have disclosed a novel method of stripping a tire from a mold as well as a novel press operation which takes full advantage of the sticking of the tire to the mold by its tread surfaces. Prior press designs have usually been characterized by a straight line opening movement for a substantial distance followed by a rocking movement, but this rocking movement has occurred after the press is opened so far that the tire is fully exposed in the lower mold half and freed from the upper half. Other presses have opened on an arc about a fixed center which causes the tire to stay in the lower section. Either of these prior motions have freed the tire entirely from one side of the mold, leaving it embedded in the opposite or lower side, from where it must be released by hand or by some auxiliary stripping means.

In the operation of the present press, however, the tire is caused to perform in an entirely new way. As the upper mold element is dragged across or caused to move laterally with respect to the lower mold element, the forward side of the tire remains embedded by its non-skid design in the upper mold element, while the rear side of the tire is embedded in the non-skid formation in the lower mold element. Continued opening movement compresses the tire diametrically between diagonally opposite areas on the tread surface and lifts the front of the tire, which is retained by the non-skid formation. During the opening movement, the tire rocks or rolls progressively out of contact with the inner surface of the mold elements, until it is held solely by the opposite diagonal areas. Gradually the rear side of the tire is fully extracted from its non-skid formation and then the front side drops away from the upper half of the mold. Thus the tire is automatically stripped by the mere opening action of the press.

The new operating mechanism has, therefore, created a new method of stripping a tire from its mold, comprising dragging one element of the mold across the other element, or effecting relative lateral movement of the mold elements while the non-skid tread of the tire is still embedded in the recesses of the mold, and then lifting the tire by its non-skid formation at one side so that it extracts itself from the non-skid formation in the lower mold element. When the tire is completely freed from the lower mold element, it will drop by gravity from the points of attachment in the upper mold element.

While I have shown and described one embodiment of my invention and one method of stripping a tire from a mold, it is to be understood that the invention is not so limited but that various modifications may be resorted to within the spirit of the invention and within the scope of the subjoined claims.

What is claimed is:

1. A method of stripping a pneumatic non-skid tire from a two-part vulcanizing mold after vulcanization comprising, shifting the mold parts obliquely relative to each other while a tire in said mold is in the path of oblique movement of said mold parts, then separating the mold parts while compressing the tire diametrically between diagonally opposite areas on the tread surface.

2. A method of stripping a pneumatic non-skid tire from a two-part vulcanizing mold after vulcanization comprising, shifting the mold parts laterally and obliquely with respect to each other while the non-skid tread is at least partially embedded in the recesses of the mold to compress the tire diametrically between diagonally opposite areas on the tread surface, and separating the mold parts while the tire is so compressed.

3. A method of stripping a pneumatic non-skid tire from a two-part vulcanizing mold which comprises shifting the mold parts laterally relative to each other to compress the tire diametrically between diagonally opposite areas on the tread surface, lifting a portion of the tire while the latter remains compressed until the unlifted portion thereof is released, and continuing said lifting until said lifted portion is also released.

4. A method of stripping a pneumatic tire having non-skid elements on its tread surface from a two-part vulcanizing mold which comprises shifting the mold parts laterally relative to each other to compress the tire diametrically between diagonally opposite areas on the tread surface, lifting a portion of the tire by its non-skid elements while the tire remains compressed until the unlifted portion thereof has its non-skid elements released from the mold, and continuing said lifting until said lifted portion is also released.

5. In a tire vulcanizing press, two cooperating mold elements, means to move one of said elements bodily in a generally arc-shaped path to and from the other element, and means to modify the said movement of said movable mold element to shift the latter element in an oblique direction with respect to the other mold element while a tire in said press is in the path of oblique movement of said movable mold element, said last named means comprising a pivoted arm having a slot therein, said movable mold element having a portion slidably connected in said slot.

6. A vulcanizing press for pneumatic tires comprising, a pair of cooperating mold elements, means for tilting one of said mold elements with respect to the other, and means including said first named means for moving one of said mold elements laterally relative to the other mold element while a tire in the press is in the path of lateral movement of said movable mold element.

7. A vulcanizing press for pneumatic tires comprising, upper and lower cooperating mold elements, means for tilting said upper mold element with respect to the lower mold element, and means including said first named means for moving said upper mold element laterally relative to the lower mold element while a tire in the press is in the path of lateral movement of said movable mold element.

8. A vulcanizing press for pneumatic tires comprising, a pair of cooperating mold elements, means for moving one of said elements away from the other to open the mold, said means including mechanism for moving said movable mold element laterally relative to the other mold element while a tire in the press is in the path of lateral movement of said movable mold element, said mechanism comprising a pivoted arm having a slot therein, said movable mold element having a portion slidably mounted in said slot.

9. In tire vulcanizing apparatus of the class described cooperating annular cavity members for embracing upper and lower portions of a tire which has been vulcanized, means for supporting and relatively moving said members to embrace a tire while the members are slightly separated, and means associated with said supporting means for relatively shifting said members a substantial distance transversely of their axes while so embracing said tire in slightly separated positions to loosen said tire from a cavity.

10. In tire vulcanizing apparatus of the class described cooperating annular cavity members for embracing upper and lower portions of a tire which has been vulcanized, means for supporting and relatively moving said members to embrace a tire with said members in slightly separated positions, and means associated with said supporting means for relatively shifting said members a substantial distance transversely of their axes while so embracing said tire to loosen said tire from a cavity, said cavity members being normally aligned axially on opposite sides of the tire when embracing the same, said shifting means being operable to shift said members a substantial distance out of axial alignment while so embracing said tire.

11. In tire vulcanizing apparatus of the class described cooperating upper and lower annular cavity members for embracing upper and lower portions of a tire which has been vulcanized, means for supporting and relatively moving said members to positions embracing a tire while said members are slightly separated, and means associated with said supporting means for relatively shifting said members a substantial distance transversely of each other while so embracing said tire to loosen said tire from a cavity, said upper member being movable toward and from said lower member, and said upper member being shiftable a substantial distance transversely of its axis while embracing the tire to loosen a tire from the lower member.

12. Apparatus for use in vulcanizing tires comprising a tire molding cavity member, a second cavity member for embracing one side of a tire protruding from said molding cavity member, means for raising said second cavity member, and means for transversely shifting said second cavity member, said last-named means including a shiftable element operable to shift the second cavity member a substantial distance transversely while both cavity members are embracing said tire to loosen said tire from said mold cavity.

13. Apparatus for use in vulcanizing tires comprising a tire molding cavity member, a second cavity member for embracing one side of a tire protruding from said molding cavity member, and means for simultaneously raising and transversely shifting said second cavity member a substantial distance transversely of its axis while embracing the tire to loosen said tire from said mold cavity member.

14. Apparatus for use in vulcanizing tires, comprising a tire molding cavity member, a second cavity member for embracing one side of a tire protruding from said molding cavity member, said cavity members being relatively movable away from each other to open the apparatus and toward each other to close the apparatus, means for raising said second cavity member, means for transversely shifting said second cavity member, said last named means including a shiftable element operable to shift the second cavity member a substantial distance transversely while both cavity members are embracing said tire to loosen said tire from said mold cavity, and means including said first named means for subsequently bringing the cavity members into substantial parallelism prior to closing the apparatus and to maintain them in parallelism until the apparatus is closed.

15. Apparatus for use in vulcanizing tires comprising a tire molding cavity member, a second cavity member for embracing one side of a tire protruding from said molding cavity member, said cavity members being relatively movable away from each other to open the apparatus and toward each other to close the apparatus, means for simultaneously raising and transversely shifting said second cavity member a substantial distance transversely of its axis while embracing the tire to loosen said tire from said mold cavity member, and means including said first named means for subsequently bringing the cavity members into substantial parallelism prior to closing the apparatus and to maintain them in parallelism until the apparatus is closed.

16. A method of stripping a pneumatic tire from a vulcanizing mold after vulcanization comprising embracing the tire with a cavity member slightly separated from a vulcanizing mold and relatively shifting the cavity member and the vulcanizing mold obliquely to each other while the tire in said mold is in the path of oblique movement of the embracing cavity member, then separating the mold and cavity member while compressing the tire diametrically between diagonally opposite areas on the tread surface of the tire.

17. A method of stripping a pneumatic tire from a vulcanizing mold after vulcanization comprising embracing the tire with a cavity member slightly separated from a vulcanizing mold and relatively shifting the cavity member and the vulcanizing mold transversely of the surface of each other a substantial distance while the tire in said mold is in the path of transverse movement of the embracing cavity member, then separating the mold and cavity member while compressing the tire diametrically between diagonally opposite areas on the tread surface of the tire.

OTTO J. KUHLKE.